(12) United States Patent
Liu

(10) Patent No.: US 10,081,731 B2
(45) Date of Patent: Sep. 25, 2018

(54) INORGANIC COATING COMPOSITION WHICH CAN BE CURED AT LOW TEMPERATURE AND A PREPARATION METHOD THEREOF

(71) Applicant: Xiaodong Liu, Beijing (CN)

(72) Inventor: Xiaodong Liu, Beijing (CN)

(*) Notice: Subject to any disclaimer, the term of this patent is extended or adjusted under 35 U.S.C. 154(b) by 0 days.

(21) Appl. No.: 15/202,238

(22) Filed: Jul. 5, 2016

(65) Prior Publication Data

US 2017/0009079 A1 Jan. 12, 2017

(30) Foreign Application Priority Data

Jul. 8, 2015 (CN) .......................... 2015 1 0396824

(51) Int. Cl.
| | |
|---|---|
| C09D 183/00 | (2006.01) |
| C09D 1/00 | (2006.01) |
| C09D 1/02 | (2006.01) |
| C09D 1/04 | (2006.01) |
| C08K 3/10 | (2018.01) |
| C08K 3/36 | (2006.01) |
| C09D 183/02 | (2006.01) |
| C09D 183/04 | (2006.01) |
| C09D 5/00 | (2006.01) |

(52) U.S. Cl.
CPC .................. *C09D 1/00* (2013.01); *C08K 3/10* (2013.01); *C08K 3/36* (2013.01); *C09D 1/02* (2013.01); *C09D 1/04* (2013.01); *C09D 5/00* (2013.01); *C09D 183/00* (2013.01); *C09D 183/02* (2013.01); *C09D 183/04* (2013.01)

(58) Field of Classification Search
None
See application file for complete search history.

(56) References Cited

U.S. PATENT DOCUMENTS

| 2012/0070626 A1 | 3/2012 | Battis |
| 2014/0170425 A1 | 6/2014 | Liu et al. |

FOREIGN PATENT DOCUMENTS

| CN | 101481553 | 7/2009 |
| CN | 101481553 A | 7/2009 |
| CN | 101668821 | 3/2010 |
| CN | 101668821 A | 3/2010 |
| CN | 102690536 | 9/2012 |
| CN | 102690536 A | 9/2012 |
| CN | 103013193 | 4/2013 |
| CN | 103013193 A | 4/2013 |
| CN | 104059398 A | 9/2014 |
| CN | 104559351 | 4/2015 |
| CN | 104559351 A | 4/2015 |
| JP | 01163276 A | 6/1989 |
| WO | 2008/075815 A1 | 6/2008 |
| WO | 2008075815 | 6/2008 |
| WO | 2008128932 | 10/2008 |
| WO | 2017/004904 A1 | 1/2017 |

OTHER PUBLICATIONS

International search report dated Apr. 11, 2016 from corresponding No. PCT/CN2015/091625.
Office Action dated Apr. 8, 2016 from corresponding No. CN 201510396824.X.
Australian Examination Report for Australian Application No. 2016204613, dated Jan. 31, 2017.
European Search Report for Application No. 16177721.4-1301, dated Nov. 21, 2016.

*Primary Examiner* — Yun Qian
(74) *Attorney, Agent, or Firm* — Oppedahl Patent Law Firm LLC

(57) ABSTRACT

The present invention relates to coating composition. And in particular, to an inorganic coating composition which can be cured at low temperature and a preparation method thereof. In order to solve the problems that the organic coating is harmful for the environment, the inorganic coating has bad flexibility, and the traditional ceramic coatings need heat and is inconvenient for curing in prior art, the present invention provide an inorganic coating composition which can be cured at low temperature and a preparation method thereof. The inorganic coating composition comprises the ingredient as below: 70-80 wt % of inorganic solution; 5-10 wt % of functional additives, which are potassium titanate, alumina, or a compound thereof; 10-20 wt % of inorganic pigment; 0.5-2.0 wt % of other functional additives. The said inorganic solution comprises the following ingredients: 30-40 wt % of organic alkoxy-silane, 15-20 wt % of organic solvent, and 25-30 wt % of silica sol. The inorganic coating composition is able to be cured at low temperature, the film formed by it has excellent flexibility, and the film will not release harmful organic gases, and is beneficial to the environmental.

8 Claims, 1 Drawing Sheet

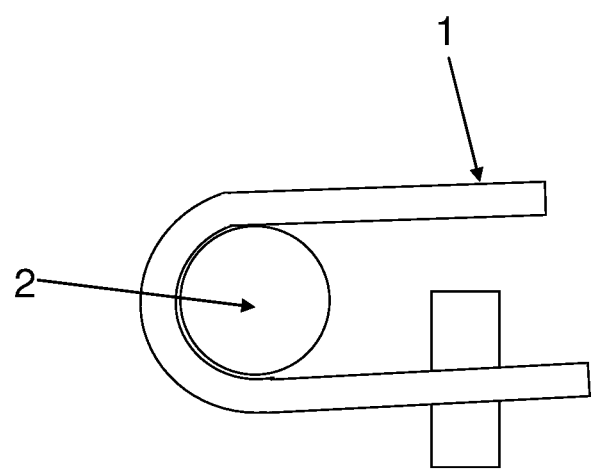

INORGANIC COATING COMPOSITION WHICH CAN BE CURED AT LOW TEMPERATURE AND A PREPARATION METHOD THEREOF

TECHNICAL FIELD OF THE INVENTION

The present invention relates to coating composition. And in particular, to an inorganic coating composition which can be cured at low temperature and a preparation method thereof. More particularly, alkoxy-silane and $SiO_2$ particles are dispersed in water, react with each other by hydrolyzing reaction, and then are performed the condensation-polymerizing reaction. Then, for giving the physical-chemical property, the first functional additives, inorganic pigment powder, and other functional additives are added to form an inorganic coating composition which can be cured at low temperature.

BACKGROUND OF THE INVENTION

The paint or coating in prior art is used to protect the structures and buildings, prolong life of the structures and buildings, and maintain beauty of the structures and buildings over a long period of time. Thus, paint or coating should be easy to use and odourless. The film formed by the coating should have better gloss, maintain the film for long time, have good chemical resistance, for example, solvent resistance, chemical resistance, weather resistance, water resistance, antibacterial, and have good physical characteristics, for example, non-flammable, flame-retardant, waterproof, high adhesive force, insulation, and so on, and should insure the safety for not harmful to human body and not causing environmental pollution. These features are the final goal of paint or coating.

Traditional anti-corrosion coatings or building coatings are made by organic compound that is extracted from crude oil and mixed with a variety of chemicals, so it contains a large amount of organic elements. When the paint or coating is applied over a period of time, the cracks will appear on the surface of the film formed by coating. Microorganisms will propagate in the cracks, and the film will peel off. If being exposed to ultraviolet light for a long time, the film will discolor and the pollution resistance will go down. In addition, most paints contain various pollutant that are harmful to human body, such pollutant will cause skin diseases, headaches, vomiting sickness and other environmental diseases. Moreover, the petroleum storage is limited, but the demand is sharply increased. The supply of raw materials of the paint production is also getting more and more intense. At the same time, in order to solve problem of the traditional coatings above mentioned, various inorganic coatings are provided. The inorganic coating mainly comprises binders, pigments, solvents, and additives. The conventional ceramic coatings contain binders, which are organic polymers such as silicon, epoxy resin or terylene resin, ceramic filling powder, or organic solvents such as acetone, benzene, toluene, xylene and ethyl acetate. Most of the additives are organic material as well.

Water-based inorganic coatings have many advantages that organic coatings does not have, such as high hardness, excellent weather resistance and stain resistance, solvent resistance, long-term heat resistance and environmentally friendliness, and so on. So they are used in industry anti-corrosive paint, civil building coating and special coating widely.

But water-based inorganic coatings have obvious friability, very poor flexibility, and larger shrinkage, and these drawbacks result the poor shock resistance. In addition, it is difficult to form a film, and the film of coating is easily to break and cause serious cracks. Meanwhile, the pure inorganic coating needs high temperature for curing. The existing low temperature curing inorganic coating, also called inorganic ceramic coating, can be cured at the temperature of 200 degrees Celsius, thus, there are many problems and inconvenient in the work process. For the defects above mentioned, the water-based inorganic coating is difficult to use widely.

SUMMARY OF THE INVENTION

In order to solve the problems that the organic coating is harmful to the environment, the inorganic coating has bad flexibility, and the traditional ceramic coatings need heat and is inconvenient for cured in the prior art, the present invention provide an inorganic coating composition which can be cured at low temperature and a preparation method thereof. The inorganic coating composition is able to be cured at low temperature, the film formed by it has excellent flexibility, and will not release the harmful organic gases, and is beneficial to environmental. Low temperature is 10° C. to 40° C.

In order to solve the abovementioned technical problem, the present invention provides the following technical solution:

An inorganic coating composition which can be cured at low temperature, the composition comprises the ingredient as below:

70-80 wt % inorganic solution, wherein the inorganic solution comprises 30-40 wt % organic alkoxy-silane (also called as alkoxy-silane, or called as organic silane), 15-20 wt % organic solvent, 25-30 wt % silica sol;

5-10 wt % first functional additives selected from potassium titanate, alumina, or mixture thereof;

10-20 wt % inorganic pigment; and 0.5-2.0 wt % other functional additives.

The first functional additives also called as functional additives.

The inorganic coating composition is 100 wt %.

Further, the inorganic coating composition also comprises deionized water.

Further, the inorganic coating composition comprises 0.5-1.5 wt % other functional additives.

Further, the inorganic coating composition comprises 0.5-1.0 wt % other functional additives.

Further, in the inorganic coating composition, the alkoxy-silane is represented by formula $R^1{}_m Si(OR^2)_{4-m}$, where $R^1$ and $R^2$ represent a substituted or non-substituted alkyl group or aryl group comprising n C where n is 1-10; m is 0-3. The total number of $R^1$ and $OR^2$ is 4.

Further, in the inorganic coating composition, the $R^1$ and/or $R^2$ are at least one of selected from the group including methyl, ethyl, phenyl, $CF_3CH_2CH_2$, $CF_3(CF_2)_5CH_2CH_2$, and $CF_3(CF_2)_7CH_2CH_2$.

Further, in the inorganic coating composition, the silica sol comprises 20-40 wt % silica ($SiO_2$) particles, the size of the silica particle is from nanometer-size to micron-size; the inorganic coating composition also comprises deionized water.

Further, in the inorganic coating composition, the inorganic pigment is selected from titanium oxide, yellow chrome, iron blue, cadmium red, cadmium yellow, carbon black, iron oxide red, or iron oxide yellow, or a mixture thereof.

Further, in the inorganic coating composition, the other functional additive is selected from tourmaline, or rare-earth ore, or a mixture thereof.

Further, in the inorganic coating composition, the functional additive comprise 3-5 wt % potassium titanate. Further, the potassium titanate is needle-shaped with a particle size of 1-100 nm.

Further, the inorganic coating composition also comprises silane coupling agent. The amount of silane coupling agent is 5-40 wt % of the total weight of inorganic coating composition. Further, the silane coupling agent is added into the inorganic coating composition before the inorganic coating composition is applied. The inorganic coating composition before adding the silane coupling agent is called part A, and silane coupling agent is called part B. The weight proportion of part A and part B is 60-95:5-40, the total weight of part A and part B is 100. Before the Part A is applied, the part B is added into the Part A, and put the container which contains part A and part B on the revolving rollers to mix and cure. The curing time is 2-20 hours, the rotation rate of the container is 50-400 r/min. Further, the silane coupling agent is a methyl trimethoxyl silane.

Further, in the inorganic coating composition, the "$OR^2$" is hydrolysable alkoxy-silane, which is hydrolyzed by water, moisture in the air, or moisture on the surface of substrate to form "silicon-hydroxyl" (Si—OH) group, which strongly bonds with the surfaces (M-OH) of the substrate through Si—O-M bond, M represents substrate.

Further, in the inorganic coating composition, the alkoxy silane is methyltrimethoxy silane, or tetraethoxy silane, or phenyltrimethoxy silane, or a mixture thereof; and the organic solvent is methanol, ethanol, or isopropanol, or a mixture thereof.

Further, the ingredients of the inorganic coating composition may be treated with ultrasonic waves.

Further, the frequency of the ultrasonic waves is equal to or more than 20 KHz, and the time for dealing is 30-40 min.

Further, the frequency of the ultrasonic waves is 20-25 KHz.

Further, in the preparing process of the inorganic coating composition, the ultrasonic waves are used to treat the mixture of the alkoxy silane and the silica sol during a mixing and reacting step of the alkoxy-silane and the silica sol.

The operating theory of ultrasonic dispersion is as below: when applying the ultrasonic waves with frequency of over 20 KHz on the object, because the repeatedly strong reduction of the air pressure, the cavitation phenomena is created. When the cavity is broken, partial high temperature, high pressure and air jets are produced. The energy produced by the ultrasonic waves is then used to disperse the particles, break the particles, and get homogenization.

Further, in order to make the powder raw materials disperse perfectly, they are irradiated with ultrasonic waves before using.

Further, in order to make the chemical reaction more completely, the liquid raw materials are irradiated with ultrasonic waves before using.

The present invention also provides a method for preparing the inorganic coating composition, the method is as follows:

Prepare the main agent and the curing agent with the ingredients respectively;

A method for preparing the main agent is as below: stirring silica sol first, adding the organic solvent, continuing to stir, adding deionized water, continuing to stir; controlling the react temperature below or equal to 50 degrees Celsius, aforesaid organic solvent is selected from methanol, or ethanol, or isopropanol, or the mixture of two kinds of them at least;

A method for preparing the curing agent is as below: adding the organic alkoxy-silane, functional additives, inorganic pigment, and other functional additives into the deionized water; and mixing evenly.

The main agent and the curing agent are mixed together and filtered through a 325-1000 mesh net to remove the particles and get the inorganic coating composition.

Further, the method for preparing the main agent is as below: stirring silica sol first, adding the organic solvent gradually, continuing to stir, adding deionized water gradually, continuing to stir; when the silica sol is mixed with deionized water, the heat will be produced and the react temperature has to be controlled below or equal to 50 degrees Celsius. A foresaid organic solvent is selected from methanol, or ethanol, or isopropanol, or the mixture of two kinds of them at least. The organic solvent will influence the speed of drying, but this drawback can be compensated by the improvement of the storage ability;

The viscosity of the main agent is usually tested by the Ford Cup. The viscosity is 14-15 seconds usually.

The present invention provides another method for preparing the inorganic coating composition, the method comprises the following steps:

(1) preparing the inorganic solution: mixing the 30-40 wt % alkoxy-silane, with the 15-20 wt % organic solvent, and 25-30% silica sol, stirring the mixture at 40-50° C. for 5-10 minutes, obtaining inorganic solution in sol state;

(2) preparing the inorganic coating mixture: placing 70-80 wt % inorganic solution generated in step (1), 5-10 wt % functional additives, 10-20 wt % inorganic pigment, and 0.5-2.0 wt % other functional additives together, stirring the mixture to get the inorganic coating mixture;

(3) placing the inorganic coating mixture generated in step (2) in a homogenizer; stirring it at a high speed for 1-2 hours to make the particles homogenized; and (4) filtering the homogenized matter generated in step (3) pass through a 325-1000 mesh net to remove the filtered particles and get the inorganic coating composition which can be cured at low temperature.

Further, in the step (1) above mentioned, preparing the inorganic solution: mixing the 30-40 wt % alkoxy-silane, with the 15-20 wt % organic solvent, and 25-30% silica sol, stirring the mixture at 40-50 degrees Celsius for 5-10 minutes, when the alkoxy-silane reacts with silica sol in the mixed solution, the heat will be produced and the mixture is turned to be transparent from turbid state gradually; the purpose of adding the organic solvent is to modulate the viscosity of the solution and the react speed. Obtaining inorganic solution in sol state by the process above mentioned;

Further, in the step (2) above mentioned, stirring the inorganic coating mixture: putting 70-80 wt % the inorganic solution generated in step (1), 5-10 wt % potassium titanate or alumina, 10-20 wt % inorganic pigment, and 0.5-2.0 wt % other functional additives together, stirring the mixture to get the inorganic coating mixture;

Further, in the step (1) above mentioned, preparing the inorganic solution: mixing the 30-40 wt % alkoxy-silane with the 15-20 wt % organic solvent, and 25-30% silica sol, stirring the mixture at 40-50 degrees Celsius for 5-10 minutes, at the same time, the ultrasonic waves is irradiated on the mixture, at this time, the alkoxy-silane reacts with silica sol in the mixing solution, the heat is produced, the mixture is turned to be transparent from turbid state gradually. In the process above mentioned, the ultrasonic waves are applied during the chemical reaction to control the bond angle of the Si—O bond created, thereby to control the direction of molecular structure, to get the controllable growth of the Si—O bond instead of self-growing.

To improve the flexibility of the inorganic coating, the potassium titanate, which have the fibre-likely shape, is used, thus, the potassium titanate is able to improve the flexibility of the materials. The inorganic pigment may use metallic oxide.

The organo-silane may be methyltrimethoxy silane, methyltriethoxy silane, or phenyl trimethoxy silane, or a mixture thereof.

The aforesaid inorganic coating composition may be called inorganic ceramic coating.

Further, the method for preparing the inorganic ceramic coating is as below:

Phase 1, preparing the inorganic solution in sol state: mixing the 30-40 wt % one kind, or two kind at least of alkoxy-silane, with the 25-30% silica sol, stirring the mixture at 40-50 degrees Celsius for 5-10 minutes to get inorganic solution in sol state; phase 2, stirring and mixing: putting 70-80 wt % inorganic solution generated in phase 1, 5-10 wt % potassium titanate and/or alumina, 10-20 wt % inorganic pigment of titanium oxide, and 0.5-2.0 wt % other functional additives together, stirring and mixing them to get the inorganic coating mixture; phase 3, putting the inorganic coating mixture generated in phase 2 in a homogenizer; stirring it at a high speed for 1-2 hours to make the particles homogenized; phase 4, filtering: having the homogenized matter generated in phase 3 pass through a 325-1000 mesh net to eliminate the bigger particles and get the inorganic ceramic coating.

Further, in the phase for preparing inorganic solution, adding organic solvent. Further, in the phase 2, 5-10 wt % functional additives comprise 3-5 wt % potassium titanate, the particle size of the potassium titanate is 1-100 nm.

The structure and theory of the inorganic coating film formed by the inorganic coating composition is as below:

The alkoxy-silane is represented with a molecular formula "$R^1_m Si(OR^2)_{4-m}$". The "$OR^2$" is hydrolyzable alkoxy-silane, which is hydrolyzed by water, moisture in the air, or moisture on the surface of substrate to form "silicon-hydroxyl" (Si—OH) group. The (Si—OH) group strongly bonds with the surfaces (M-OH) of the substrate through Si—O-M bond. As shown in table 1, the Si—O bond has higher bond energy than other bond. The inorganic coating film has the features of weather resistance, chemical resistance, abrasive resistance, high hardness, meanwhile owing to the flexibility and resilience of the silicon-oxygen bond, the inorganic coating film also has the features of cold resistance and tolerance to repeating heat shock.

TABLE 1

The bond energy and length of each bond

| Bond | Bond energy (Kcal/mol) | Bond length (Å) |
|---|---|---|
| Si—H | 76 | 1.48 |
| Si—O | 108 | 1.63 |
| Si—F | 135 | 1.54 |
| C—C | 83 | |

Å is the length unit.

In the present invention, the organic silane forms an inorganic solution through hydrolysis and condensation polymerization under the presence of silicon dioxide ($SiO_2$). The inorganic solution has "silicon-hydroxyl" (Si—OH) group, and this group generates Si—O-M bond, which has strong bond energy, thereby, the inorganic solution itself can play the role as a strong binder.

Further, the inorganic silane is tetraethoxysilane, or methyl trimethoxy silane, or the compound thereof. By adding 20-30% silica sol and stirring the mixture, the inorganic solution above mentioned can be obtained. In case the amount of silica sol deviates from the above range, it may weaken the bind force of the Si—O-M, thereby, the film will peel off at a high-temperature.

In addition, in order to improve the physical-chemical characteristics of the film formed by coating composition, potassium titanate or alumina may be used as first functional additive. Since the particles of these materials are needle-shaped or plate-shaped, they may prevent cracks and control the viscosity of coating composition. The amount of the first functional additive will be in the range of 5-10 wt %. If adding the first functional additives less than 5 wt %, deterioration of the performance of film may occur, and the surface of the film will be rough. If adding the first functional additives more than 10 wt %, gloss and adhesive force of the film will be reduced.

The inorganic coating composition in the present invention may be used as a substitute of the paints in prior art. To this end, it must be colorful. In order to get a variety of color, the coating in prior art uses the organic pigments or dye, but, these organic matters will cause various problems. Accordingly, the inorganic coating composition in the present invention uses pigment of metallic oxide to represent a variety of color. It is desirable to contain 10-20 wt % pigment. In case the amount of pigment added is less than the range, the gloss will be lower; and in case the amount of pigment added is more than the range, the adhesive force between the film and the substrate will be reduced. In addition, to give more properties to the film, the inorganic coating composition in the present invention contains 0.5-2.0 wt % other functional additive.

In addition, titanium oxide may be added in the inorganic coating composition in order to get photocatalysis effects. As titanium oxide is activated by light, it can change various pollutants into innocuous matters.

In addition, according to the necessary, in order to release negative ions or radiate far infrared rays, the other function additives may be added into the inorganic coating composition. The other function additives comprise the matter which can release negative ions. Generally, tourmalines and rare-earth ores are used as matters which can release negative ions.

The inorganic coating composition, by adding function additives, gives the coating film flexibility, prevents cracks, and solves the problem of thick film. In order to prepare inorganic coating composition which can be cured at low temperature, the condensation-polymerizing reaction is performed between silica sol and alkoxy-silane. The coating composition will be cured at low temperature to form the inorganic film. The film has excellent properties, and, is not harmful to human body, and is environmentally safe.

Compared with the prior art, the inorganic coating composition in present invention has excellent properties which do not exist in the prior art. That is, the present invention solves the difficult problem of curing at low temperature for the inorganic coating composition, which can be used on the surface of big building or device. The present invention does not need big baking device, thus does not need boiler, and so on, improves the production efficiency, also saves the fee for fuel, is beneficial to the environment. In addition, the film formed by the inorganic coating composition has good flexibility. In addition, the inorganic coating composition in present invention does not comprise the harmful organic material, easy to use, no smell, have excellent chemical and physical resistance, can maintain the film long time, is not harmful to the human body, will not pollute the environment, ensure the safety, and provide useful result. Further, the film may prevent the release of the harmful substances such as VOCs or formaldehydes, and may reduce the occurrence of the sick house syndromes. In addition, the ingredient of the film is inorganic material, thus, the film will influence environment at the lowest degree when the film is discarded, for the properties of heat and ultraviolet rays resistance, prevent the exfoliation and discoloration, can maintain the beautiful appearance long time.

BRIEF DESCRIPTION OF THE DRAWING

FIG. 1 is a structural schematic diagram of the flexibility test of the film formed by the inorganic coating composition in present invention.

DETAILED DESCRIPTION OF THE INVENTION

According to technology solution and the preparing method provide in the present invention, several examples is provided below. These examples are not intended to limit the scope of the invention.

Example 1

The present invention provides an inorganic coating composition, the preparing method thereof is as below:

(1) preparing inorganic solution: 30 wt % silica sol is mixed with 30 wt % of organic silane and 15 wt % ethanol, and the mixed solution is stirred at 40-50 degrees Celsius for 5-10 minutes. The organic silane is the methyl trimethoxy silane, or tetraethoxy silane, or a mixture thereof. The mixed solution of organic silane and silica sol create chemical reaction, the heat is produced, and the mixed solution changes from a turbid state to a transparent state. At this time, adding methanol, or ethanol, or isopropanol, or the mixture thereof to control the viscosity and the reaction speed of the solution. The inorganic solution in sol state is made through these processes.

(2) stirring the mixed solution: the inorganic solution generated in step (1), 9 wt % functional additives, which are potassium titanate or alumina, 15 wt % pigment powders of titanium oxide, and 1 wt % other functional additives are mixed and stirred to form an inorganic ceramic mixture.

(3) homogenizing: the solution generated in step (2) is put in a homogenizer, and is stirred at a high speed for 1-2 hours to homogenize the particles.

(4) filtering the coatings: the homogenized matter is passed through a 325-1000 mesh net and remove bigger particles to get the inorganic coating composition.

Example 2

The present invention provides an inorganic coating composition which can be cured at low temperature, the composition comprises the ingredient as below:

70 wt % inorganic solution. The said inorganic solution comprises the following ingredient: 30 wt % tetraethoxysilane, 15 wt % ethanol, 25 wt % silica sol;

10 wt % functional additives, which is the mixture of potassium titanate and alumina, wherein the amount of potassium titanate is 3 wt %.

19.5 wt % inorganic pigment;

0.5 wt % other functional additives, the other functional additive is tourmaline;

The percentage above mentioned is the proportion of each ingredient in the whole of inorganic coating composition, by weight.

Example 3

The present invention provide an inorganic coating composition which can be cured at low temperature, the composition comprises the ingredient as below:

80 wt % inorganic solution. The said inorganic solution comprises the following ingredient: 40 wt % the mixture of tetraethoxysilane and methyl trimethoxysilane, the ratio of tetraethoxysilane and methyl trimethoxysilane is 1:1 by weight, 15 wt % ethanol, 25 wt % silica sol;

5 wt % functional additives, which are the mixture of potassium titanate and alumina, the amount of potassium titanate is 4 wt %;

13 wt % inorganic pigment;

2.0 wt % other functional additives, the other functional additive is tourmaline;

The percentage above mentioned is the proportion of each ingredient in the whole of inorganic coating composition, by weight.

Example 4

The present invention provide an inorganic coating composition which can be cured at low temperature, the composition comprises the ingredient as below:

80 wt % inorganic solution. The said inorganic solution comprises the following ingredient: 30 wt % methyl trimethoxysilane, 20 wt % ethanol, 30 wt % silica sol;

6 wt % functional additives, which are the mixture of potassium titanate and alumina, the amount of potassium titanate is 5 wt %;

13 wt % inorganic pigment;

1 wt % other functional additives, the other functional additive is rare-earth ore;

The percentage above mentioned is the proportion of each ingredient in the whole of inorganic coating composition, by weight.

Example 5

The present invention provide an inorganic coating composition which can be cured at low temperature, the composition comprises the ingredient as below:

74.5 wt % inorganic solution, the said inorganic solution comprises the following ingredient: 30 wt % methyl triethoxy silane, 15 wt % ethanol, 29.5 wt % silica sol;

5 wt % functional additives, which are potassium titanate;

20 wt % inorganic pigment;

0.5 wt % other functional additives, the other functional additive is rare-earth ore;

The percentage above mentioned is the proportion of each ingredient in the whole of inorganic coating composition, by weight.

Example 6

The present invention provide an inorganic coating composition which can be cured at low temperature, the composition comprises the ingredient as below:

77 wt % inorganic solution. The said inorganic solution comprises the following ingredient: 35 wt % organic alkoxy-silane, 15 wt % ethanol, 27 wt % silica sol;

7 wt % functional additives, which are potassium titanate;

15 wt % of inorganic pigment;

1 wt % other functional additives, the other functional additive is the mixture of tourmaline and rare-earth ore, the ratio of tourmaline and rare-earth ore is 1:1 by weight;

The percentage above mentioned is the proportion of each ingredient in the whole of inorganic coating composition, by weight.

The alkoxy-silane is represented with a molecular formula "$R^1_m Si(OR^2)_{4-m}$", the "$R^2$" is phenyl, m is 0.

Example 7

An inorganic coating composition as shown in the example 6, wherein, the organic alkoxy-silane is represented with a molecular formula "$R^1_m Si(OR^2)_{4-m}$", the "$R^1$" is $CF_3CH_2CH_2$, the "$R^2$" is $CF_3CH_2CH_2$, m is 1.

Example 8

An inorganic coating composition as shown in the example 6, wherein, the organic alkoxy-silane is represented with a molecular formula "$R^1_m Si(OR^2)_{4-m}$", the "$R^1$" is $CF_3(CF_2)_5CH_2CH_2$, the "$R^2$" is $CF_3(CF_2)_5CH_2CH_2$, m is 2.

Example 9

An inorganic coating composition as shown in the example 6, wherein, the organic alkoxy-silane is represented with a molecular formula "$R^1_m Si(OR^2)_{4-m}$", the "$R^1$" is $CF_3(CF_2)_7CH_2CH_2$, the "$R^2$" is $CF_3(CF_2)_7CH_2CH_2$, m is 3.

Example 10

An inorganic coating composition as shown in the example 6, wherein, the organic alkoxy-silane is represented with a molecular formula "$R^1_m Si(OR^2)_{4-m}$", the "$R^1$" is methyl, the "$R^2$" is phenyl, m is 1.

Example 11

An inorganic coating composition as shown in the example 6, wherein, the organic alkoxy-silane is represented with a molecular formula "$R^1_m Si(OR^2)_{4-m}$", the "$R^1$" is ethyl, the "$R^2$" is $CF_3CH_2CH_2$, m is 1.

Example 12

An inorganic coating composition as shown in the example 6, wherein, the organic alkoxy-silane is represented with a molecular formula "$R^1_m Si(OR^2)_{4-m}$", the "$R^1$" is phenyl, the "$R^2$" is $CF_3(CF_2)_7CH_2CH_2$, m is 2.

Example 13

An inorganic coating composition as shown in the example 6, wherein, the organic alkoxy-silane is represented with a molecular formula "$R^1_m Si(OR^2)_{4-m}$", the "$R^1$" is $CF_3CH_2CH_2$, the "$R^2$" is methyl, m is 3.

Example 14

An inorganic coating composition as shown in the example 6, wherein, the organic alkoxy-silane is represented with a molecular formula "$R^1_m Si(OR^2)_{4-m}$", the "$R^1$" is $CF_3(CF_2)_5CH_2CH$, the "$R^2$" is methyl and ethyl, m is 2.

Example 15

An inorganic coating composition as shown in the example 6, wherein, the organic alkoxy-silane is represented with a molecular formula "$R^1_m Si(OR^2)_{4-m}$", the "$R^1$" is $CF_3(CF_2)_7CH_2CH_2$, the "$R^2$" is phenyl, m is 1.

Example 16

An inorganic coating composition as shown in the example 6, wherein, the organic alkoxy-silane is phenyl trimethoxysilane.

Coat the inorganic coating composition provided by the examples on the substrate, form film, the thick of the film is 30±5 μm, the substrate is aluminum plate. The size of the aluminum plate is 15 cm×7.5 cm, the coating is curing at low temperature for 7 days, form hard film.

The test result and the test data of the film formed by the inorganic coating composition provided by the example 1-16 are shown in table 2 and table 3.

TABLE 2

The test result of the film formed by the inorganic coating composition provided by the example 1-16

| Test item | Test result | Test condition | note |
|---|---|---|---|
| Gloss | 0-70 | Gloss test device (60°standard) | |
| Pencil hardness | 7-9H | Mitsubishi pencil | |
| Adhesive force | 100/100 | one hundred grid method, 1 m/m | |
| Shock resistance | no abnormality | 1 kg ball, 50 cm height | |
| abrasive resistance | 99.99 | abrasive coefficient | |
| Pollution resistance | non-pollution | 5E Max | |
| Acid resistance | no abnormality | 5% $H_2SO_4$, 48 hours | |
| Alkali resistance | no abnormality | 5% $Na_2CO_3$/15 minutes × 4 times | |
| Boiling water resistance | no abnormality | 98degrees Celsius × 2 hours | |
| Heat resistance | no abnormality | 300degrees Celsius × 1 hours | |
| Salt water resistance, | no abnormality | 5% NaCl × 1000 hours | |
| Weather resistance | no abnormality | WeatheR1-O-MeteR1, 1000 hours | |
| Color | Many kinds | — | |

TABLE 3

The test data of the film formed by the inorganic coating composition provided by the example 1-16

| No. | gloss % | Pencil hardness | Adhesive force |
|---|---|---|---|
| example 1 | 45-55 | 7-9H | 0 grade |
| example 2 | 45-55 | 7-9H | 0 grade |
| example 3 | 35-45 | 8-9H | 1 grade |

TABLE 3-continued

The test data of the film formed by the inorganic coating
composition provided by the example 1-16

| No. | gloss % | Pencil hardness | Adhesive force |
|---|---|---|---|
| example 4 | 45-55 | 7-9H | 1 grade |
| example 5 | 40-50 | 7-9H | 0 grade |
| example 6 | 40-50 | 7-9H | 0 grade |
| example 7 | 40-50 | 7-9H | 0 grade |
| example 8 | 45-55 | 7-9H | 0 grade |
| example 9 | 30-35 | 6-9H | 0 grade |
| example 10 | 30-35 | 6-9H | 1 grade |
| example 11 | 45-50 | 7-9H | 0 grade |
| example 12 | 45-55 | 7-9H | 0 grade |
| example 13 | 25-30 | 6-8H | 1 grade |
| example 14 | 30-35 | 7-8H | 0 grade |
| example 15 | 40-50 | 7-9H | 0 grade |
| example 16 | 40-50 | 7-9H | 0 grade |

Flexibility test: The inorganic coating composition in present invention is coated on the soft substrate, and the composition is cured to form a film. The substrate is a bendable aluminum sheet. The thickness of the substrate is 0.3 mm. The thickness of the film is 20-25 μm. As shown in FIG. 1, putting the rod 2 on the film 1, the diameter of the rod 2 is 9.5 mm. The substrate is bent along the rod, the substrate with film may be bent to parallel to the horizontal plane to twine around the rod. There are no cracks on the surface of the bent film.

The flexibility of the film formed by the inorganic coating composition may also be evaluated by the scratch test, or pendulum hardness test. The scratch test and the pendulum hardness test are as below.

Because the film formed by the water-base PU Acrylic coating has excellent flexibility, it is used here as a reference. The flexibility of the film formed by the inorganic coating composition in present invention is tested. The flexibility of the film formed by water-base PU Acrylic coating is tested as well for comparing the test results and evaluating the flexibility of the film formed by the inorganic coating composition in present invention.

Scratch test, use the break through force to represent the test result. The test method includes the steps as below:

(1) Coating the coating composition on steel substrate, forming the film with fixed thickness;

(2) A needle is placed on the film;

(3) Applying a force on the needle, and pushing the needle to move on the film: in 60 seconds, the force is increased from 0 N to 100 N;

(4) Meanwhile the needle is moved 1 cm on the film;

(5) Observe and record the data of the force when the film is broken.

The standard of broke is as below: by washing the film with water, the film is peeled off the substrate and the substrate is seen clearly. When the force of breaking the film is bigger, the film is more resistant to the scratch and the flexibility of the film is better.

Pendulum hardness test, the test method includes steps as below:

(1) Coating the coating composition on steel substrate, forming the film with fixed thickness;

(2) A pendulum is swung on the coated substrate;

(3) Pendulum is resting on two balls;

(4) Softness of substrate is damping the oscillation;

(5) Pendulum hardness is given as time in seconds it takes to decrease the amplitude from 6° to 3°.

When the time is longer, the pendulum hardness of the film is higher and the flexibility of the film is worse.

Pencil hardness test: fixing the Mitsubishi pencil on the hardness test device at 45° angle, applying force of 1 Kg on the pencil and pushing the pencil moving forward.

Adhesive force test: use the one hundred grid method.

Abrasive test: using the abrasive test device (Model KPM-042), the wheel used is CS-10 wheel, putting the sample on the test device, loading 500 g of gravity and turning 500 circles. Then, the UV spectrophotometer is used to test the absorbance of the surface of the sample at 370 nm to observe whether the surface turn to indistinct or not. The abrasive resistance is tested at last step.

Comparative Example 1

Preparing an inorganic coating composition, the preparation method thereof is as below:

(1) preparing inorganic solution: 35% silica sol is mixed with 100 wt % methyl trimethoxy silane, and the mixed solution is stirred at 50 degrees Celsius for 10 minutes, ethanol is added to control the viscosity, and the inorganic solution is obtained.

(2) mixing 60 wt % inorganic solution generated in step (1), with 20 wt % potassium titanate, 8 wt % pigment of iron oxide, and 12 wt % rare-earth ore to form an inorganic ceramic mixture.

(3) homogenizing: the solution obtained in step (2) is put in a homogenizer, and is stirred at a high speed for 2 hours to homogenize the particles.

(4) filtering coatings: the homogenized matter generated in step (3) is passed through a 325-1000 mesh net to remove the bigger particles and get the coating composition.

Coating the composition in comparative example 1 on substrate of aluminum plate. The result is as below:

1. The film formed has cracks;
2. Shocking resistance: 1 Kg ball, fall from the height of 50 cm, the film peel off from the substrate.

Comparative Example 2

Preparing an inorganic coating composition. The composition comprises the ingredient as below:

70 wt % inorganic solution, 12 wt % functional additives, which is potassium titanate.

17.5 wt % inorganic pigment;

0.5 wt % other functional additives, the other functional additive is tourmaline;

The said inorganic solution comprises the following ingredient: 30 wt % methyl trimethoxysilane, 15 wt % ethanol, 25 wt % silica sol;

The percentage above mentioned is the proportion of each ingredient in the whole of inorganic coating composition, by weight.

Compared with the composition provided by the present invention, the amount of function additive is higher.

Comparative Example 3

Preparing an inorganic coating composition. The composition comprises the ingredient as below:

80 wt % inorganic solution, 3 wt % functional additives, which are alumina;

15 wt % inorganic pigment;

2.0 wt % other functional additives;

The said inorganic solution comprises the following ingredient: 40 wt % tetraethoxysilane, 15 wt % isopropanol, 25 wt % silica sol;

The percentage above mentioned is the proportion of each ingredient in the whole of inorganic coating composition, by weight.

Compared with the composition provided by the present invention, the amount of function additive is lower.

Comparative Example 4

Preparing an inorganic coating composition, the composition comprises the ingredient as below:
80 wt % inorganic solution;
9 wt % of functional additives, which are potassium titanate;
10 wt % inorganic pigment;
1 wt % other functional additives;

The said inorganic solution comprises the following ingredient: 45 wt % methyl trimethoxysilane, 15 wt % ethanol, 20 wt % silica sol;

The percentage above mentioned is the proportion of each ingredient in the whole of inorganic coating composition, by weight.

Compared with the composition provided by the present invention, the amount of organic alkoxy-silane is higher, the amount of silica sol is lower.

Comparative Example 5

Preparing an inorganic coating composition, the composition comprises the ingredient as below:
75 wt % inorganic solution;
10 wt % functional additives, which are potassium titanate;
13 wt % inorganic pigment;
2.0 wt % other functional additives;

The said inorganic solution comprises the following ingredient: 25 wt % methyl trimethoxysilane, 15 wt % ethanol, 35 wt % silica sol;

The percentage above mentioned is the proportion of each ingredient in the whole of inorganic coating composition, by weight.

Compared with the composition provided by the present invention, the amount of organic alkoxy-silane is lower, the amount of silica sol is higher.

Comparative Example 6

Preparing an inorganic coating composition, the composition comprises the ingredient as below:
90 wt % inorganic solution;
5 wt % functional additives, which are alumina;
3 wt % inorganic pigment;
2.0 wt % other functional additives;

The said inorganic solution comprises the following ingredient: 40 wt % organic alkoxy-silane, 20 wt % isopropanol, 30 wt % silica sol;

The percentage above mentioned is the proportion of each ingredient in the whole of inorganic coating composition, by weight.

Compared with the composition provided by the present invention, the amount of inorganic solution is higher, the amount of inorganic pigment is lower.

Comparative Example 7

Preparing an inorganic coating composition, the composition comprises the ingredient as below:
65 wt % inorganic solution;
10 wt % functional additives, which are the mixture of potassium titanate and alumina, the ratio of potassium titanate and alumina is 1:1 by weight;
23 wt % inorganic pigment;
2.0 wt % other functional additives;

The said inorganic solution comprises the following ingredient: 30 wt % organic alkoxy-silane, 10 wt % isopropanol, 25 wt % silica sol;

The percentage above mentioned is the proportion of each ingredient in the whole of inorganic coating composition, by weight.

Compared with the composition provided by the present invention, the amount of inorganic solution is lower, the amount of inorganic pigment is higher.

The properties of the product of comparative examples 2-7 are shown in the table 4.

TABLE 4

The properties of the product of comparative examples 2-7

| No. | coating and the film state | Gloss % | Pencil hardness | Adhesive force | Shock resistance |
|---|---|---|---|---|---|
| Comparative example 2 | High viscosity, difficult to form the film | flat gloss | 3-5H | 2 grade | The film peel off |
| Comparative example 3 | — | 40-50 | 6-7H | 1 grade | The film crack |
| Comparative example 4 | High viscosity, the film is unqualified | flat gloss | 4-5H | 1-2 grade | The film peel off |
| Comparative example 5 | High viscosity, the film is unqualified | flat gloss | 4-5H | 1-2 grade | The film peel off |
| Comparative example 6 | Can not cover the substrate | 10-20 | 5-6H | 1 grade | The film crack |
| Comparative example 7 | High viscosity, the film is unqualified | 10-20 | 4-5H | 1-2 grade | The film peel off |

We can conclude from the test results of the examples and the comparative examples, the inorganic coating composition in present invention may cure at low temperature, the film formed has high hardness, acid resistance, alkali resistance, salt water resistance, weather resistance, and has good adhesive force.

The flexibility of the film formed by the inorganic coating composition in present invention is tested by scratch test and pendulum hardness test. The flexibility of the film formed by water-base PU Acrylic coating is tested as well by scratch test and pendulum hardness test. The test results are shown in table S. The test results can be used to compare and evaluate the flexibility of the film formed by the coating composition in present invention.

TABLE 5

Test result of the scratch test and pendulum hardness test

| | film formed by the inorganic coating composition in present invention | the film formed by water-based PU Acrylic coating | Evaluation of the flexibility |
|---|---|---|---|
| Break through force/N | 37 | 39 | Break through force of the film formed by the coating in the present invention is very close to the break through force of the film formed by the water-base PU Acrylic coating. The test result state: the flexibility of two kinds of films are at the same level. |
| Pendulum hardness/s | 167 | 180 | The time spent on the film formed by the coating in the present invention is shorter than the time spent on the film formed by the water-base PU Acrylic coating. The test result state: the flexibility of two kinds of films is at the same level. The film formed by the coating composition in the present invention may slow down the shock better, that is, The film formed by the coating composition in the present invention has better flexibility. |

We can conclude from the above test result, the film formed by the coating composition in the present invention has excellent flexibility, and the flexibility is very close to the flexibility of the film formed by the water-base PU Acrylic coating.

The above mentioned, only is the preferred examples in the present invention, that is not intend to limit the protective scope. Any changes or modifications according to the present invention, are all covered by the patent scope of the present invention.

What is claimed is:

1. An inorganic coating composition which is curable at low temperature,
   wherein the inorganic coating composition comprises:
   70-80 wt % inorganic solution, wherein the inorganic solution comprises 30-40 wt % organic alkoxy-silane, 15-20 wt % organic solvent, and 25-30 wt % silica sol;
   5-10 wt % first functional additive selected from potassium titanate, alumina, or mixture thereof;
   10-20 wt % inorganic pigment; and
   0.5-2.0 wt % other functional additive selected from tourmaline, rare-earth ore, or a mixture thereof;
   wherein
   the organic alkoxy-silane is represented by formula $R^1_m Si(OR^2)_{4-m}$, where $R^1$ and $R^2$ represent a substituted or non-substituted alkyl group or aryl group comprising 1-10 carbon atoms, where m is 0-3;
   $R^1$ or $R^2$ are at least one selected from the group including methyl, ethyl, phenyl, $CF_3CH_2CH_2$, $CF_3(CF_2)_5CH_2CH_2$, and $CF_3(CF_2)_7CH_2CH_2$, and alternatively wherein
   $R^1$ and $R^2$ are at least one of selected from the group including methyl, ethyl, phenyl, $CF_3CH_2CH_2$, $CF_3(CF_2)_5CH_2CH_2$, and $CF_3(CF_2)_7CH_2CH_2$.

2. The inorganic coating composition of claim 1, wherein the silica sol comprises 20-40 wt % silica ($SO_2$) particles, a size of the silica particle is from nanometer-size to micron-size.

3. The inorganic coating composition of claim 1, wherein the first functional additive comprises 3-5 wt % potassium titanate, the potassium titanate is needle-shaped with a particle size of 1-100 nm.

4. The inorganic coating composition of claim 1, wherein the organic alkoxy-silane is methyl trimethoxy silane, tetraethoxysilane, phenyl, trimethoxy silane or a mixture thereof; and the organic solvent is methanol, ethanol, isopropanol or a mixture thereof.

5. The inorganic coating composition of claim 1, wherein the ingredients of the inorganic coating composition are treated by ultrasonic waves.

6. The inorganic coating composition of claim 5, wherein, a frequency of the ultrasonic waves is equal or more than 20 KHz, and the time for treating is 30-40 minutes.

7. The inorganic coating composition of claim 5, wherein the ultrasonic waves are used to treat the mixture of the organic alkoxy-silane and the silica sol during a mixing and reacting step of the organic alkoxy-silane and the silica sol.

8. The method for preparing the inorganic coating composition of claim 1, wherein the method comprises the following steps:
   (1) preparing the inorganic solution: mixing the 30-40 wt % organic alkoxy-silane, with the 15-20 wt % organic solvent, and 25-30% silica sol; and stirring the mixture at 40-50 degrees Celsius for 5-10 minutes to get inorganic solution in sol state;
   (2) preparing the inorganic coating mixture: putting 70-80 wt % the inorganic solution generated in step (1), 5-10 wt % functional additives, 10-20 wt % inorganic pigment, and 0.5-2.0 wt % other functional additives together; and stirring the mixture to get the inorganic coating mixture;
   (3) placing the inorganic coating mixture generated in step (2) in a homogenizer; and stirring it at a speed sufficient for homogenization for 1-2 hours to make the particles homogenized; and
   (4) filtering the homogenized matter generated in step (3) pass through a 325-1000 mesh net to remove bigger particles; and obtaining the inorganic coating composition which is curable at a temperature between 10-40 degrees Celsius.

* * * * *